(12) United States Patent
Christensen et al.

(10) Patent No.: US 9,506,739 B2
(45) Date of Patent: Nov. 29, 2016

(54) DISTANCE MEASUREMENT BY BEATING A VARYING TEST SIGNAL WITH REFERENCE SIGNAL HAVING ABSOLUTE FREQUENCY VALUE PREDETERMINED WITH A SPECIFIED ACCURACY

(71) Applicant: MagiQ Technologies, Inc, Somerville, MA (US)

(72) Inventors: Caleb A Christensen, Somerville, MA (US); Anton Zavriyev, Swampscott, MA (US); A. Craig Beal, Stoneham, MA (US)

(73) Assignee: MagiQ Technologies, Inc., Somerville, MA (US)

( * ) Notice: Subject to any disclaimer, the term of this patent is extended or adjusted under 35 U.S.C. 154(b) by 267 days.

(21) Appl. No.: 14/138,012

(22) Filed: Dec. 21, 2013

(65) Prior Publication Data
US 2015/0331109 A1 Nov. 19, 2015

Related U.S. Application Data

(60) Provisional application No. 61/740,670, filed on Dec. 21, 2012.

(51) Int. Cl.
*G01B 9/02* (2006.01)
*G01S 7/48* (2006.01)
*G01S 17/32* (2006.01)
*G01S 7/491* (2006.01)

(52) U.S. Cl.
CPC ....... *G01B 9/02003* (2013.01); *G01B 9/02041* (2013.01); *G01S 7/4808* (2013.01); *G01S 7/4915* (2013.01); *G01S 17/325* (2013.01)

(58) Field of Classification Search
CPC .. G01B 9/02041; G01S 7/4808; G01S 17/36
See application file for complete search history.

(56) References Cited

U.S. PATENT DOCUMENTS

2011/0211198 A1\* 9/2011 Koda ................ G01B 9/02004
356/499

\* cited by examiner

*Primary Examiner* — Hwa Lee (57) ABSTRACT

A method determines a distance with a specified accuracy. The method transmits to an interferometer a test signal oscillating with a test frequency and receives, in response to the transmitting, an interferometric signal formed by interfering the test signal with a delayed signal produced by delaying a copy of the test signal over the distance equal to a path length difference in the interferometer. The test frequency is varying such that the test signal oscillates with different values of the test frequency. The method determines at least two values of the test frequency corresponding to particular values of the interferometric signal by beating the test signal with a reference signal having a reference frequency, wherein a value of the reference frequency is an absolute value predetermined with the specified accuracy. The method determines the distance using the two values of the test frequency.

16 Claims, 9 Drawing Sheets

DISTANCE MEASUREMENT BY BEATING A VARYING TEST SIGNAL WITH REFERENCE SIGNAL HAVING ABSOLUTE FREQUENCY VALUE PREDETERMINED WITH A SPECIFIED ACCURACY

CROSS-REFERENCE TO RELATED APPLICATIONS

This application claims the priority under 35 U.S.C. §119(e) from U.S. provisional application Ser. No. 61/740,670 filed on Dec. 21, 2012, the disclosure of which being incorporated herein by reference.

FIELD OF THE INVENTION

This invention relates to optical measurements of distances, and, in particular, to an optical system for interferometric measurement with specified accuracy.

BACKGROUND OF THE INVENTION

Laser interferometers are widely used to measure a distance. Laser interferometers operate by splitting radiation source into two beams, an object beam and a reference beam, using, for example, a beam splitter. The reference beam is directed to a reference mirror located at a known distance from the beam splitter. The object beam is directed to a surface of a target located at some unknown distance from the beam splitter. The object beam is reflected from the surface, and is recombined with the reference beam.

The object beam and reference beam constructively or destructively interfere, depending on the relative phase of the object beam compared to the reference beam. A detector measures the intensity of the interference light related to the phase difference between the object beam and the reference beam, which is, in turn, related to the difference in the object path length from the beam splitter to the surface.

The periodic nature of interferometric output signal presents a challenge in absolute measurements. For example, some laser interferometer systems for determining an absolute distance to an object use multiple wavelengths to eliminate uncertainty regarding which specific period of the cyclic interference of light corresponds to a current measurement. However, those systems generally may not allow accuracy substantially better than a wavelength.

However, it is difficult to produce an optical signal with high specified frequency. This is because a laser for generating such signal has to be calibrated to the desired accuracy. The calibration requires stabilization against fluctuations of the temperature, vibrations and other possible disturbances. Such calibration is proved to be difficult in practice. In addition, modern detection systems are generally incapable of accurately measuring the frequency of optical signals to better than ±100 MHz. This means for a centimeter-scale gap, the measurement error is on the order of 10 nm, or a significant fraction of an optical wavelength. As a result, measuring distances with a specified accuracy poses a great challenge in the art of interferometric measurements.

SUMMARY OF THE INVENTION

It is an object of the invention to provide a system and a method suitable for optically measuring distances with specified accuracy. For example, it is desirable to measure optically distances ranging from few meters to less than 1 micron with accuracy greater than 1 part per billion (ppb).

It was generally realized that such high-precision optical measurements can be used by various interferometric sensors arranged in harsh environments, i.e., where the usage of electronic devices is problematic. Exemplary applications for such sensors include a tilt meter based on optical reflectors that move depending on the direction of gravity, and various pressure, temperature, and strain sensing.

Furthermore, it is desirable to achieve this level of measurement accuracy without reliance on any mechanical references, while avoiding fringe counting allowing the measurements to be interrupted. Such a method is particularly suited for measurements that must be taken with extremely high accuracy over long periods of time, such as measuring tectonic drift or volcanic activity with laser rangefinders, monitoring tiltmeters to observe the effects of prolonged underground activity, e.g., from construction projects, oil and gas production, or ground-water usage, or long-term data collection from any sensors which can be interrogated by measuring distances optically. In addition, performing the measurement without requiring accurate prior knowledge of an earlier position measurement enables the applications where multiple sensors are interrogated for an extended period of time by a single interrogating system.

Various embodiments of the invention determine high-precision interferometric measurements by measuring and analyzing signals with varying frequencies. However, a number of modern measurement systems are incapable of measuring such signals with required accuracy. For example, in order to interferometrically measure distances with 1 ppb accuracy, the frequencies of the interrogating signals have to be known with 1 ppb accuracy. Modern systems cannot determine the arbitrary frequencies greater than ~50 GHz with specified accuracy, e.g., better than 1 ppb. However, measurements of such frequencies with such specified frequency can be needed for determining distances accurately.

In addition, a typical commercial laser or fiber laser is only as stable as its cavity size, which changes with temperature, current, gain medium aging and mechanical strain, all of which can change over time, especially in the presence of environmental disturbances. The manufacturing variability of any laser model is also of concern, requiring each device to be independently characterized under operating conditions before any accuracy in wavelength can be obtained, which is rarely accurate to better than a part in $10^5$ or $10^6$.

Various embodiments of the invention are based on a realization that a tunable laser module emitting a test signal oscillating with a tunable test frequency can be stabilized on a frequency reference determined with the specified accuracy. An example of such a frequency reference is a reference signal generated by a laser stabilized to an atomic reference, which has accuracy of frequency greater than 1 ppb.

For example, by interfering two signals of sufficiently high, but comparable frequencies, the resulted modulated signal includes a high frequency component. i.e., a carrier signal with a frequency representing an average of the frequencies of the two interfered signals, that is distinguishable from a low frequency component of the modulated signal, i.e., a modulation signal with a beat frequency representing a difference between the frequencies of the two interfered signals. Thus, the beat frequency of the low frequency component is measurable and can be used in measuring and analyzing high frequency signals. Accordingly, if the frequency of one of the high frequency signals is known with specified accuracy, that known frequency can be used as a reference to determine the unknown frequency of another signal. Also, if the known frequency is selected sufficiently close to the unknown frequency, the low frequency component can be accurately measured with available commercial detectors, and thus the total cost of the measurements can be reduced.

Accordingly, various embodiments of the invention beat the test signal against the reference signal oscillating with the reference frequency predetermined with the specified accuracy. The resulting beat frequency can be selected to fall within microwave or radio frequency range and accurately measured. Accordingly, the test frequency determined based on the beat frequency and the reference frequency can be determined with the accuracy of the reference signal.

In one embodiment, a laser is stabilized to an atomic or molecular reference, using sub-Doppler spectroscopy. Properly implemented, this can allow absolute wavelength accuracy of an inexpensive laser to a part in $10^9$ as long as the wavelength matches an appropriate transition. Furthermore, the locked wavelength does not change with temperature, mechanical alignment, or conditions of the reference cell, and there are rarely additional transitions close enough in frequency to offer any ambiguity over which line is locked.

Generally, in one aspect, the invention relates to method for determining a distance with a specified accuracy. The method includes transmitting to an interferometer a test signal oscillating with a test frequency, wherein the test frequency is varying such that the test signal oscillates with different values of the test frequency; receiving, in response to the transmitting, an interferometric signal formed by interfering the test signal with a delayed signal produced by delaying a copy of the test signal over the distance equal to a path length difference in the interferometer, such that the values of the interferometric signal are indicative of the distance and based at least in part on the values of the test frequency; determining at least two values of the test frequency corresponding to particular values of the interferometric signal by beating the test signal with a reference signal having a reference frequency, wherein a value of the reference frequency is an absolute value predetermined with the specified accuracy; and determining the distance using the two values of the test frequency.

Various embodiments of the invention include one or more of the following features. For example, the values of the test frequency are in an optical domain, and wherein a difference between a value of test frequency and the value of the reference frequency is in a microwave domain or a radio frequency domain. The method includes interfering the test signal with the reference signal to produce a modulated signal having a high frequency component oscillating with a carrier frequency and a low frequency component oscillating with a beat frequency; measuring a value of the beat frequency; and determining the test frequency with the specified accuracy based on the value of the beat frequency and the value of the reference frequency.

In one embodiment, the two values of the test frequency include a first value and a second value, and the method includes interfering the reference signal and the test signal with the test frequency having the first and the second values to produce a first modulated signal and a second modulated signal; measuring a first beat frequency of the first modulated signal and a second beat frequency of the second modulated signal; determining the first value of the test frequency based on the first beat frequency and the reference frequency; and determining the second value of the test frequency based on the second beat frequency and the reference frequency.

In one embodiment, the method can also include a step of modulating the test signal such that the test signal acquires a test frequency component including one or combination of sideband and offset frequencies, wherein a difference between the test frequency component and the reference frequency is within a microwave domain or a radio frequency domain. In alternative embodiment, the method can include modulating the reference signal such that the reference signal acquires a reference frequency component including one or combination of sideband and offset frequencies, wherein a difference between the test frequency and the reference frequency component is within a microwave domain or a radio frequency domain. In another variation, the method can include modulating the test signal such that the test signal acquires a test frequency component; and modulating the reference signal such that the reference signal acquires a reference frequency component, wherein a difference between the test frequency component and the reference frequency component is within a microwave domain or a radio frequency domain.

In various embodiments the reference signal is predetermined with an absolute specified accuracy. For example, the reference signal can be locked on an atomic reference, a molecular reference, or an optical frequency comb. The values of the interferometric signal include one or combination of amplitudes of an intensity of the interferometric signal, and phases of the interferometric signal.

In one embodiment, the method further includes interfering, concurrently with the transmitting, the test signal with the reference signal to produce a modulated signal for each value of the test frequency; measuring a beat frequency of the modulated signal and the value of the interferometric signal for each value of the test frequency; determining a map of corresponding values of the beat frequencies and/or the test frequencies, and values of the interferometric signal; and determining the two values of the test frequencies using the map.

Generally, in another aspect, the invention focuses on an system for measuring a distance with a specified accuracy. The system includes a tunable laser module with a stabilized reference frequency, for emitting a test signal oscillating with a tunable test frequency and for determining values of the tunable test frequency relative to the stabilized reference frequency, wherein the reference frequency is predetermined with the specified accuracy, such that the values of the tunable test frequency are determined with the specified accuracy; an optical detector for determining values of an interferometric signal corresponding to the values of the test frequency, wherein the interferometric signal is produced in response to emitting the test signal, such that the values of the interferometric signal are indicative of the distance; and a controller for receiving the values of the test frequency and the values of the interferometric signal, and for determining the distance based on two values of the test frequency corresponding to particular values of the interferometric signal.

In one embodiment, the tunable laser module includes a tunable laser for emitting the test signal; a reference laser for emitting a reference signal oscillating with the reference frequency; an optical splitter for splitting the test signal into a sampled path and an output path;

an optical combiner for combining the test signal received from the sampled path with the reference signal to produce a modulated signal having a high frequency component oscillating with a carrier frequency and a low frequency component oscillating with a beat frequency, wherein the beat frequency is within a microwave domain or a radio frequency domain; and a measurement module for determining the beat frequency and for determining the test frequency with the specified accuracy based on the beat frequency and the reference frequency. The tunable laser module can also include a modulator modulating the test signal or the reference signal such that the test signal or reference signal acquire additional frequency components ensuring that the beat frequency is within the microwave or the radio frequency domains.

In one embodiment, the controller determines a map of corresponding values of the test frequencies and the values of the interferometric signal, selects from the map at least two values of the test frequency corresponding to particular values of the interferometric signal, and determines the distance using the two values of the test frequency. In some embodiment, the system can also include a dither signal generator for generating a dither signal modulating the test signal; and a harmonic analysis system for determining values of the interferometric signal based on a copy of the dither signal.

In some embodiment, the system also includes a sensor including an unbalanced interferometer for receiving the test signal from the output path and for producing the interferometric signal by delaying a copy of the test signal over the distance equal to a path length difference in the interferometer. For example, the sensor can be arranged underground, wherein the output path is formed at least in part by a fiber connecting the sensor with the tunable laser module, and wherein the sensor includes a tilt meter, such that the distance is changing based on a direction of gravity.

In one embodiment, the system includes a processor for determining based on the distance one or combination of a temperature, a pressure, and strain in an environment of the sensor. In another embodiment, the system includes a plurality of sensors for producing a plurality of interferometric signals.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Various implementations of the present invention and related inventive concepts are described below. It should be appreciated, however, that the present invention is not limited to any particular manner of implementation, and that the various embodiments discussed explicitly herein are primarily for purposes of illustration.

Figure 1:
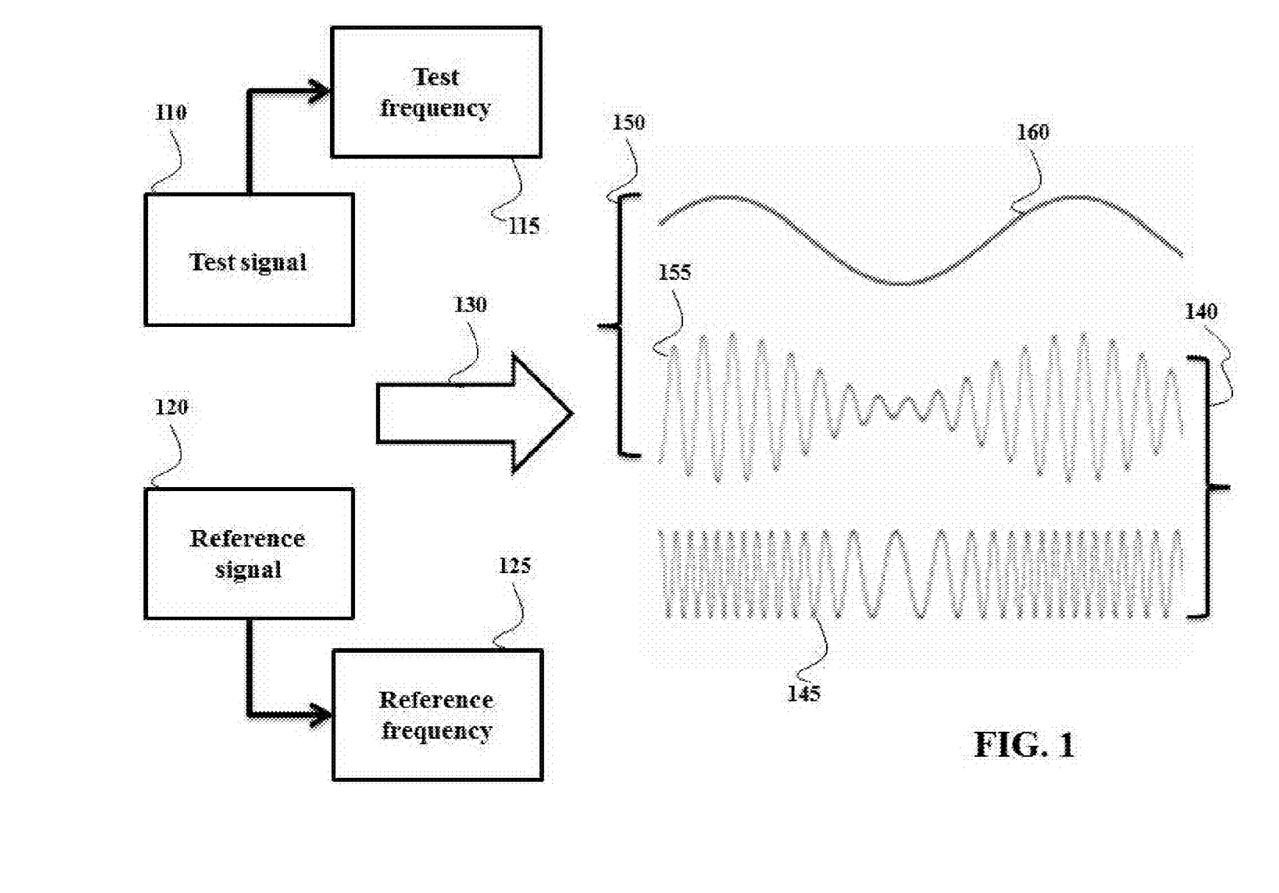
FIG. 1 is an illustration of a method to mix two high frequency signals in such a way that a low frequency measurement facilitates precise measurement of the frequency of the unknown test signal.

FIG. 1 shows an illustration of a realization employed by some embodiments of the invention to accurately measure high frequencies of the optical signals. If two signals, e.g., a test signal 110 and a reference signal 120 are added 130 to produce a third signal, the signal includes two components oscillating with frequencies depending on the value and differences between the frequencies of the mixed signals. For example, if the frequencies 115 and 125 of the signals 110 and 120 are randomly selected, the resulting signal 140 includes signals 155 and 145, which can be mixed together in an undistinguishable manner.

However, if two signals 110 and 120 are periodic, and oscillate at a test frequency 115 of the test signal 110 and a reference frequency 125 of the reference signal 120, where frequencies 115 and 125 have comparable values, the resulting signal is a modulated signal 150 that includes a high frequency component, i.e., a carrier signal 155 oscillating with a frequency representing a sum of the frequencies 115 and 125, that is distinguishable from a low frequency component of the modulated signal, i.e., a modulation signal 160 oscillating with a beat frequency representing a difference between the frequencies 115 and 125 of the two interfered signals. Thus, the beat frequency can be measured and used to determine the test frequency 115 of the test signal.

Furthermore, if the frequency 125 of one of the reference signal is known, that known frequency can be used as a reference to determine the unknown frequency 115. Also, if the reference frequency is selected sufficiently close to the test frequency, the low frequency component can be accurately measured with available commercial detectors, and thus the total cost of the measurements can be reduced. For example, if the difference between the test and the reference frequencies is within a microwave range, there are number of commercially available sensors for measuring the beat frequency.

As used herein, a beat is interference between two periodic signals of different frequencies, perceived as periodic variations in intensities of the interfered signal whose rate is the difference between the two frequencies. It can be proven that the successive values of maxima and minima form a signal whose frequency equals the difference between the frequencies of the two interfering signals.

For example, mathematically, an interference of two sinusoidal signals of unit amplitude with the test frequency f1 and the reference frequency f2 is according to $$\sin(2\pi f_1 t) + \sin(2\pi f_2 t) = 2\cos\left(2\pi \frac{f_1 - f_2}{2} t\right)\sin\left(2\pi \frac{f_1 + f_2}{2} t\right). \quad (1)$$

If the difference between the test frequency f1 and the reference frequency f2 is sufficiently small, e.g., within a microwave range, the frequency of the cosine of the right side of the expression above, that is (f1−f2)/2, is often too slow, and perceived as a periodic variation of the sine in the expression above (it can be said, the cosine factor is an envelope for the sine wave), whose frequency is (f1+f2)/2, i.e., the average of the two frequencies.

However, because the sine part of the right side function alternates between negative and positive values many times during one period of the cosine part, only the absolute value of the envelope used by some embodiments. Therefore the frequency of the envelope is twice the frequency of the cosine, which means the beat frequency is:

$$f_{beat} = f_1 - f_2. \qquad (2)$$

In order to interferometrically measure distances with a specified accuracy, such as 1 part per billion (ppb), the frequencies of the signals have to be known with the specified accuracy. Modern systems cannot determine the arbitrary frequencies greater than ~50 GHz with accuracy better than 1 ppb. However, measurements of such high frequencies maybe required.

Accordingly, various embodiments of the invention beat the test signal against the reference signal oscillating with the reference frequency determined with the specified accuracy. An example of such a reference signal is a signal generated by a laser stabilized to an atomic reference, which has accuracy of frequency greater than 1 ppb. The resulting beat frequency can selected to be within the microwave or radio frequency range.

Figure 2:
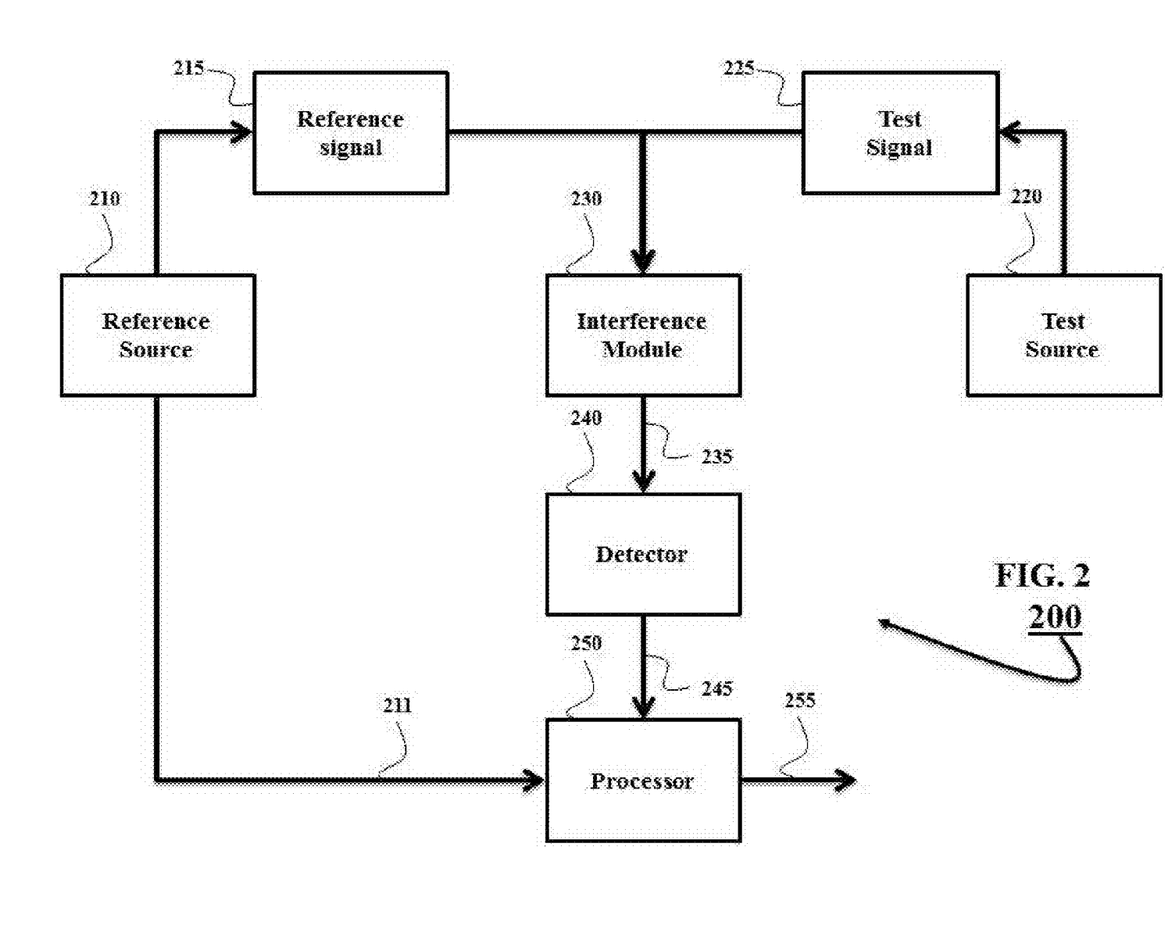
FIG. 2 is a diagram of a system for measuring a frequency of a signal employing principles of the method of FIG. 1.

FIG. 2 shows a block diagram of a system 200 for measuring frequency of an optical signal using corresponding beat frequency. The system 200 includes a reference source 210 for generating a reference signal 215 oscillating with a reference frequency. The system 200 can also optionally include a test source 220 for generating a test signal 225 oscillating with a test frequency. Alternatively, the test signal can be provided by an external source whose frequency is to be determined.

The system 200 also includes an interference module 230 for interfering the test signal with the reference signal to produce a modulated signal 235 having a high frequency component oscillating with a carrier frequency and a low frequency component oscillating with a beat frequency representing a difference between the test and the reference frequencies. In some embodiments, the reference frequency is predetermined, such that the difference between the test and the reference frequencies is lower than 50 GHz, e.g., within a microwave range.

The system 200 also includes a detector 240 for measuring the beat frequency 245 and a processor 250 for determining the test frequency 255 based on the beat frequency 245 and the reference frequency 211. The detector 240 can include an RF or MW frequency counter, a spectrum analyzer, a tunable resonator, or other frequency sensitive device, e.g., a high speed photodiode. In some embodiments, the processor determines the test frequency based on equations provided above.

In some embodiments, the values of the test frequency are in an optical domain, e.g., greater than 50 GHz, and the reference frequency is predetermined with the specified accuracy. For example, the reference frequency has an absolute value of predetermined with a fractional accuracy no less than specified fractional accuracy of the distance measurement. For example, the reference frequency can be locked on an atomic reference, such that a value of the reference frequency is predetermined with the accuracy greater than 1 part per billion (ppb). Also, the value of the reference frequency and/or the values of the test frequency are selected such that a difference between a value of the test frequency and the value of the reference frequency is within a microwave domain or a radio frequency domain, e.g., is lower than 50 GHz. In such manner, a value of the beat frequency can be measured and the value of the test frequency can be determined with the specified accuracy, e.g., greater than 1 ppb, based on the value of the beat frequency and the value of the reference frequency.

Determining the Distance Using Corresponding Beat Frequencies

Figure 3A:
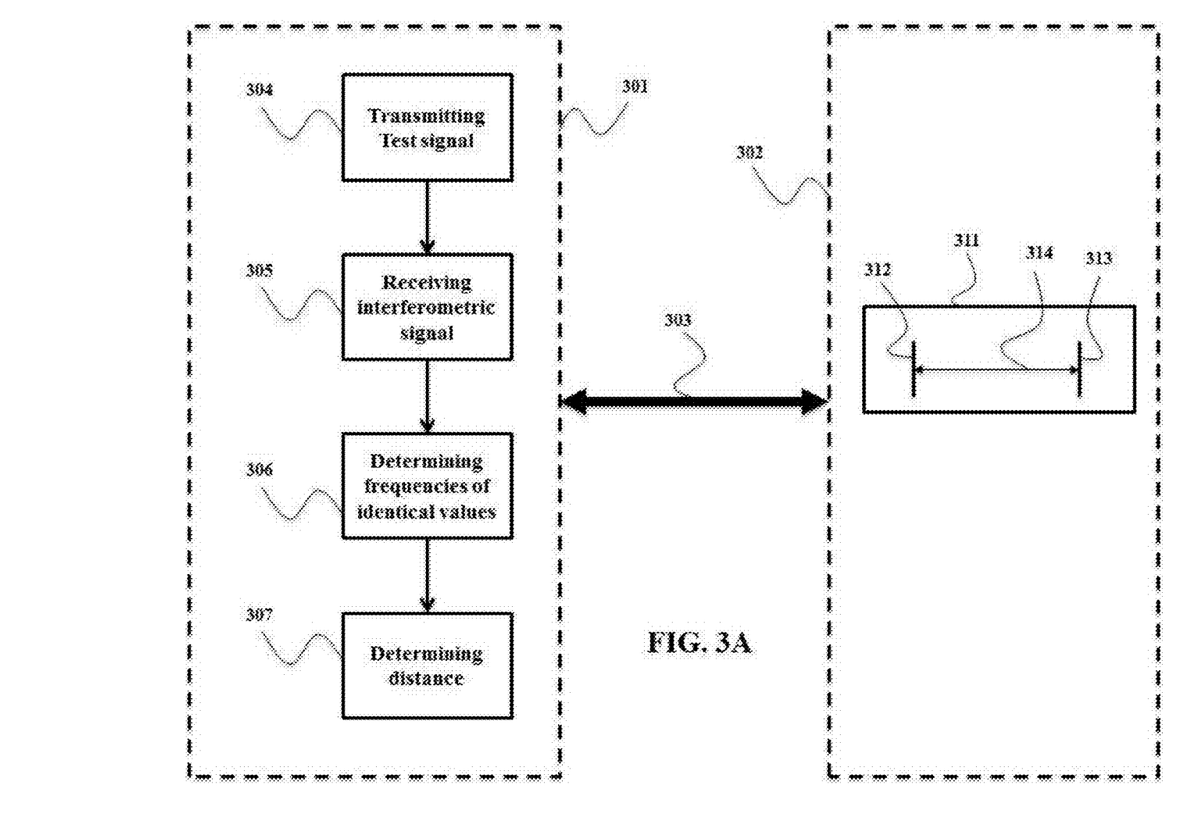
FIG. 3A is an illustration of a method for determining a distance between a reference surface and a target surface of an interferometer according to one embodiment of the invention.

FIG. 3A shows a schematic of a method for determining a distance between a reference surface and a target surface of an interferometer according to one embodiment of the invention. The method can be implemented by an interrogator system 301 optically connected to a sensor 302 over an optical conduit 303, e.g., an optical fiber. The sensor 302 can include an interferometer 311, e.g., an unbalanced interferometer, and the method can be implemented to measure the distance 314 between a reference surface 312 and a target surface 313 of the interferometer 311. Such arrangement allows to place interferometric sensors 302 in the harsh environments, e.g., underground where the usage of electronic devices is problematic, and to conduct all measurements in the aboveground interrogator system 301.

The interrogator system 301 transmits 304 to the interferometer 311 a test signal oscillating with a test frequency and receives 305 an interferometric signal in response to that transmitting. The test signal is tunable, i.e., the test frequency is varying such that the test signal oscillates with different values of the test frequency and the values of the interferometric signal are based at least in part on the values of the test frequency and indicative of the distance 314. For example, the interferometric signal can be formed by interfering the test signal with a delayed signal produced by delaying a copy of the test signal over the distance 314 equal the path length difference in an interferometer, such as a reflector spacing in a Fabry-Perrot interferometer or path length mismatch in a Mach-Zender or Michelson interferometer. Examples of the values of the interferometric signal include one or combination of amplitudes of an intensity of the interferometric signal and phases of the interferometric signal.

The interrogator system 301 determines 306 at least two values of the test frequency corresponding to particular values of the interferometric signal and determines 307 the distance using the two values of the test frequency. In various embodiments, the values of the test frequency are determined by beating the test signal with a reference signal having a predetermined reference frequency, according to the principles described above. In one embodiment the particular values of the interferometric signal corresponding to maxima, minima or quadrature of the amplitude of the interferometric signal.

Figure 3B:
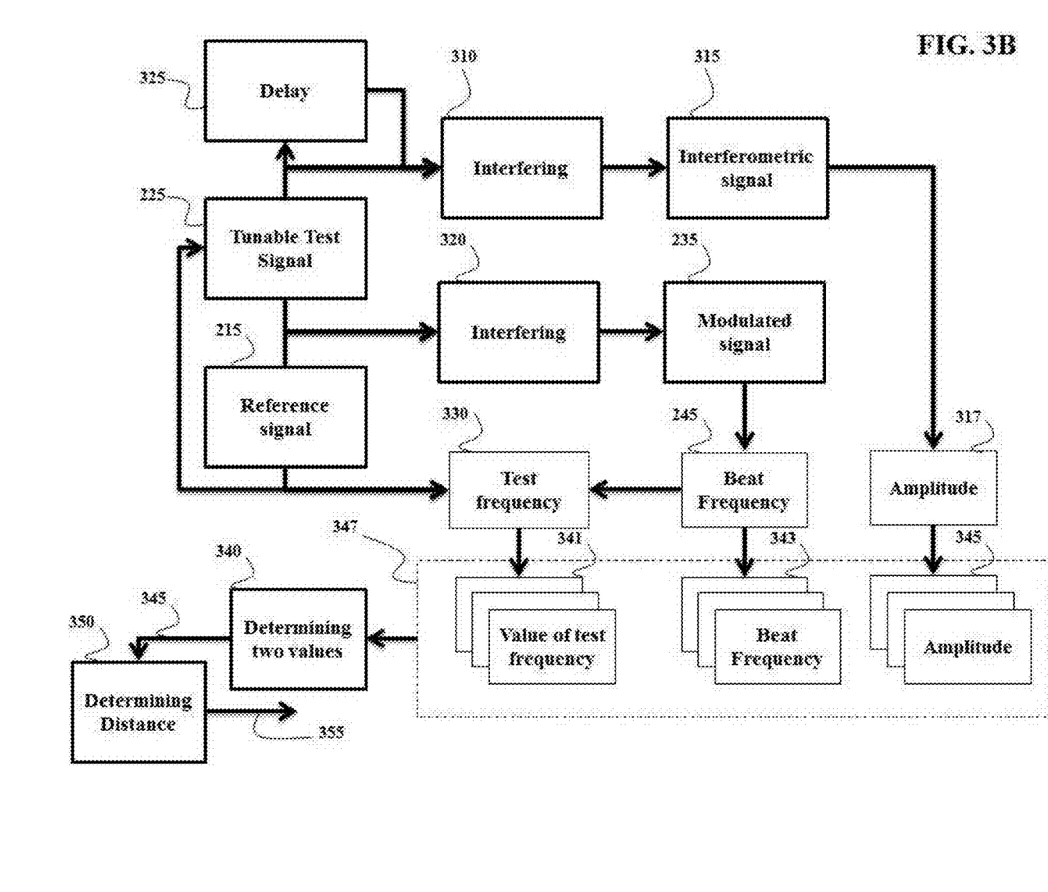
FIG. 3B is a diagram of a method for measuring the distance according to some embodiments of the invention.

FIG. 3B shows a block diagram of a method for determining the distance according to one embodiment of the invention. The test signal 225 is interfered at the interference module 310 with a copy of the test signal 325 delayed over the distance to produce an interferometric signal 315 having values, e.g., values of the amplitude 317, indicative of the distance. The test signal oscillates with the test frequency 250.

Concurrently with the interfering 310, the test signal 225 is interfered 320, e.g., using the interference module 230, with a reference signal 215 oscillating with a reference frequency 211 to produce a modulated signal 235 having a high frequency component oscillating with a carrier frequency and a low frequency component oscillating with a beat frequency representing a difference between the test and the reference frequencies.

The test frequency is varying, such that the test signal oscillates with different values of the test frequency while performing the interference 310 and 320, to produce a set 341 of values of the test frequencies corresponding to a set 345 of values of the interferometric signal and corresponding to a set 343 of values of the beat frequency. The values of the test frequencies are determined 330 based on the reference frequency and corresponding value of the beat frequency. The sets 343 and 345, and/or the set 341 can form a collection of values, e.g., a map 347, stored in a memory connected to the processor 250. The map 347 uniquely associates each value of the test frequency and/or a value of the beat frequency with a value of the interferometric signal.

Next, the method determines 340 at least two values 345 of the test frequency causing particular values of the amplitude of the interferometric signal. For example, the method detects the identical values of the amplitude corresponding to maxima, minima or quadrature of the amplitude, selects corresponding beat frequencies from the map 347 and determines the two values of the test frequency based on the reference frequency 211 and the selected beat frequencies corresponding to the identical values of the amplitude. After the two values of the test frequencies resulting in the particular values of the amplitude of the interferometric signal are determined, the distance 355 is determined 350 based on those two values of the test frequencies.

The values of beat frequency 343, together with values of the interferometric signal 345 and the reference frequency 211 allow the determination of the absolute position of interferometric features with the accuracy limited only by the frequency reference which can be very accurate. The difference between these values (the fringe spacing, similar to the Free Spectral Range of a cavity or a frequency comb) can also be determined, and might be known to even higher accuracy than the reference. These pieces of information can be used to solve a system of equations to determine the distance with the specified accuracy and no ambiguity.

Examples of Lasers and Microwave Measurements

In the description of the figures that follow, functional blocks are labeled with a number (i.e. 400), signals or signal paths contain an S prefix (i.e. S400), and explicitly optical paths or signals are labeled with an L prefix (i.e. L400). Some or all of the optical paths can be optical fibers.

Figure 4:
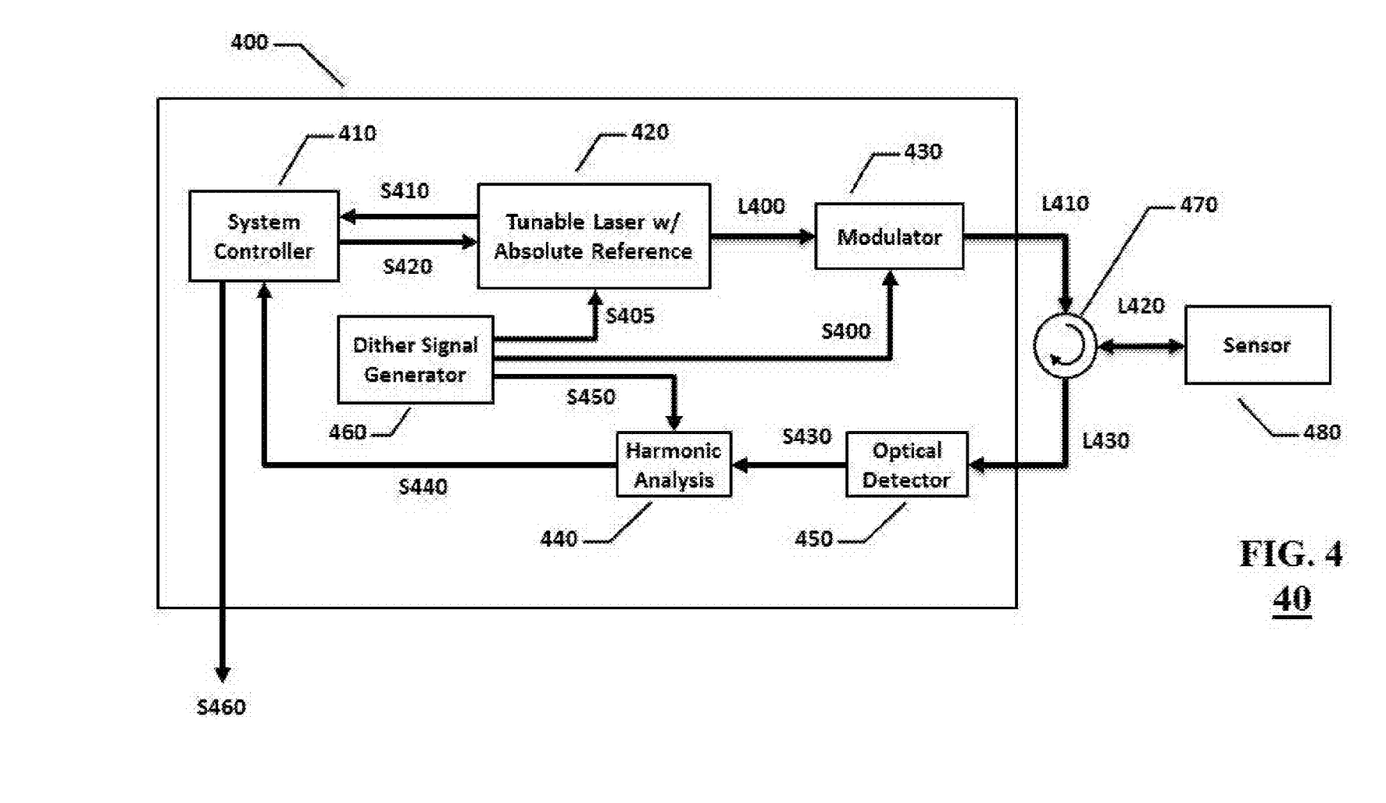
FIG. 4 is a diagram of a sensor system according to an embodiment of the invention.

FIG. 4 shows a sensor system 40 according to an embodiment of the invention. The system includes an optical interrogator 400 and at least one sensor 480. The interrogator 400 supplies an interrogating optical signal L410 to the sensor and receives a returned optical signal L430 from the sensor. In the example embodiment the sending and returning optical signals are directionally multiplexed onto a bidirectional optical path L420 using an optical circulator 470. In other implementations optical circulator 470 can be an optical switch or can be omitted and L410 and L430 extend all the way to and from the sensor.

The interrogator 400 includes a system controller 410 which can include a microprocessor as well as analog and/or digital hardware. A tunable laser 420 with an absolute frequency reference emits a controlled frequency output L400 which is the source of the optical interrogation signal. The measured frequency S410 of the tunable laser is reported to the system controller 410. The system controller 410 can control the frequency of the laser by adjusting a frequency tuning signal S420.

In one embodiment, the interrogating optical signal L410 is modulated, e.g., dithered, in frequency, phase, or intensity.

The modulation signal is produced by the dither signal generator 460. In one implementation, the dither signal is applied to the optical signal by applying a dither signal S400 to an external optical modulator 430. Alternatively the dither signal S405 is applied directly to the tunable laser 420. When a modulation is applied, L410 is a dithered optical signal.

The state of sensor 480 is determined by analyzing the dithered optical signal modified by sensor 480 and returned on L430. Optical detector 450 converts the optical signal L430 to an electrical signal S430, which can be processed using electrical signal processors. A harmonic analysis system 440 receives a copy of the dither signal S450. The harmonic analyzer 440 searches S430 for the fundamental and harmonic components of S450 and determines their respective amplitudes. This information S440 is supplied to the system controller which can use this information to both control the tunable laser and report the state of the sensor.

The system controller also can produce an output signal S460 used to control pulsing electronics used for a time domain multiplexed (TDM) implementation of the sensor system 40.

The system controller 410 can use the measured quantities, measured frequency S410 and the harmonic analysis 440 to control the tunable laser 420 via the frequency tuning signal S420. For example, in one embodiment, the system controller uses a feedback signal from the frequency measurement S410 to keep the tunable laser 420 stabilized at a specific frequency. In this embodiment, an error signal is generated by the difference between the desired and the measured frequency.

Another embodiment receives a feedback signal from the harmonic analysis 440. This embodiment monitors the amplitude of a dither harmonic on S430 and stabilizes, e.g., minimizes, the amplitude using the frequency control signal S420. Stabilizing the tunable laser according to this embodiment allows direct measurement of the laser frequency.

Figure 5:
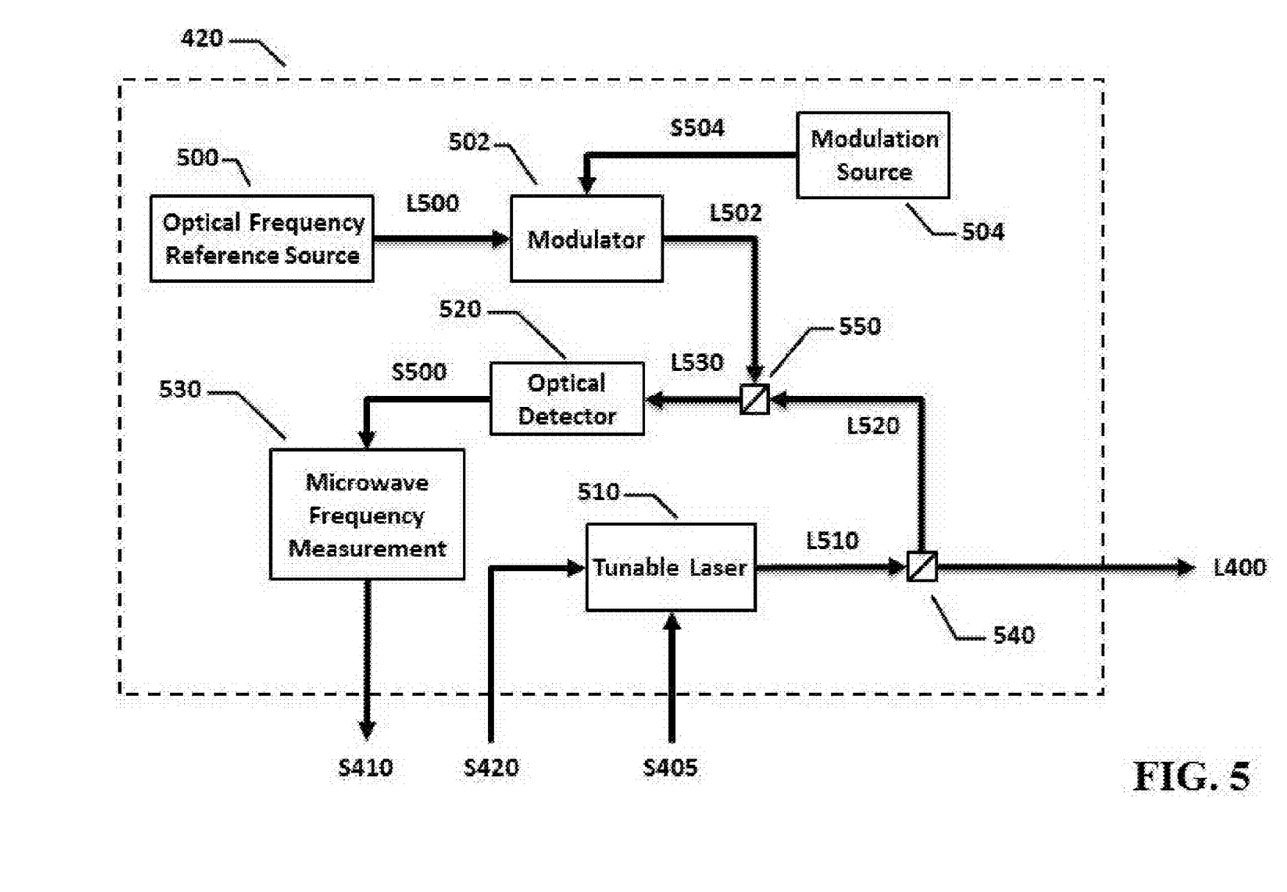
FIG. 5 is a diagram of a tunable laser system according to an embodiment of the invention.

FIG. 5 shows an example of the tunable laser with optical frequency reference subsystem 420. Subsystem 420 includes an optical frequency reference source 500, which outputs light L500 at a stable precisely known frequency. In an example embodiment, optical reference 500 can be a narrow linewidth laser which is frequency locked to an atomic reference.

Subsystem 420 includes an optical modulator 502 at the output L500 of optical frequency reference 500. The modulator 502 is driven with a modulation signal S504 generated by modulation source 504. The output of modulator 502 can be frequency shifted or have modulation sidebands.

Subsystem 420 also includes a tunable laser 510. Tunable laser 510 has a frequency controlled output L510, which is split by beam splitter 540 into a sampled path L520 and an output path L400. The optical frequency of 510 is controlled by a frequency tuning signal S420. If a dither signal is applied directly to the tunable laser this is provided by dither signal S405.

The sampled optical signal L520 is combined with L502 using optical beam combiner 550 to form a combined optical signal L530. The two optical fields in L530 beat together on an optical detector 520 to form a microwave beat frequency signal S500. The frequency of the beating is measured with a microwave frequency counter 530. The resulting frequency measurement S410 is passed to the system controller.

The microwave frequency counter 530 and optical detector 520 have practical limits on frequency range. Some embodiments provide a shifted optical frequency reference by shifting the frequency or adding modulation sidebands with optical modulator 502. Shifting the optical frequency reference can be used to extend the microwave frequency measurement range in an approach similar to heterodyning a modulated RF carrier down to baseband or an intermediate frequency (IF). Alternatively modulator 502 can be placed in optical path L520.

Figure 6:
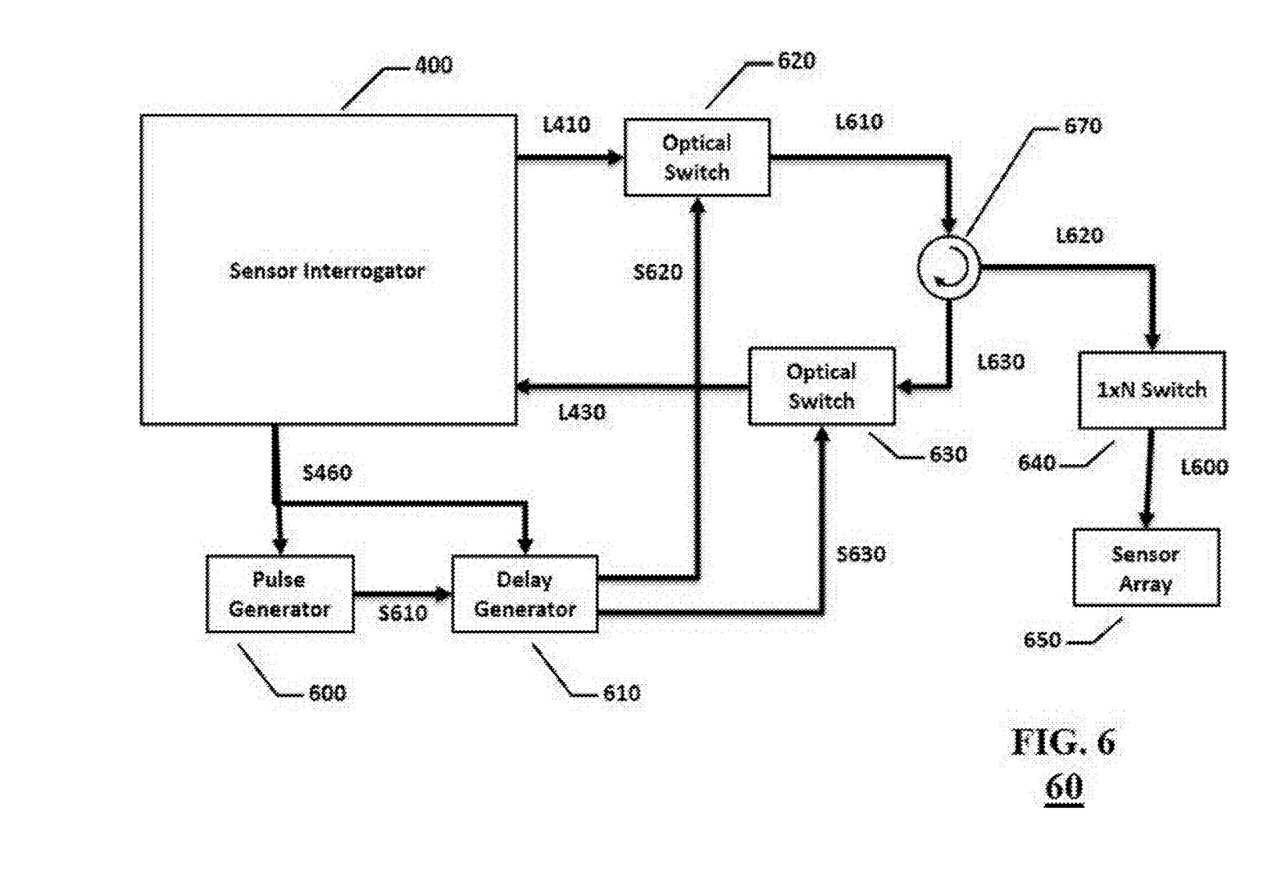
FIG. 6 is a diagram of a sensor system which includes elements to allow multiplexing according to another embodiment of the invention.

FIG. 6 shows a sensor system 60, which has been modified to add time division multiplexing (TDM) to sensor system 40. The system 60 includes a sensor interrogator 400, sensor array 650 and several other components specific to the TDM operation. The dithered optical output L410 is switched on and off with optical switch 620 to create a dithered optical output pulse stream on L610. A pulse generator 600 generates pulses S610, which are copied and delayed by delay generator 610. An output S620 of delay generator 610 controls the switching of optical switch 620. The operation of pulse generator 600 and delay generator 610 is conducted by control signals S460 generated by the system controller 410 located in the sensor interrogator 400.

In the example embodiment, the sending and returning optical signals are directionally multiplexed onto a bidirectional optical path L620 using an optical circulator 670. In one embodiment, bidirectional optical path L620 is connected to an N-fiber optical path L600 via a 1×N optical switch 640. Each fiber in L600 is connected to an independent TDM sensor array. For an M sensor array, M optical pulses return on optical path L630 for each optical pulse transmitted by switch 620. TDM sensor system 60 can include an optical switch 630 for selecting the mth pulse from the sting of M returning pulses. Optical switch 630 is driven by the S630 output of delay generator 610, which carries a delayed copy of the pulse sent on S620. The delay is variable and is controlled by TDM control signal S460. Varying the delay chooses which of M return pulses are selected. The mth pulse selected by switch 630 appears at the output L430 which is the returning optical pulse input of sensor interrogator 400.

Figure 7:
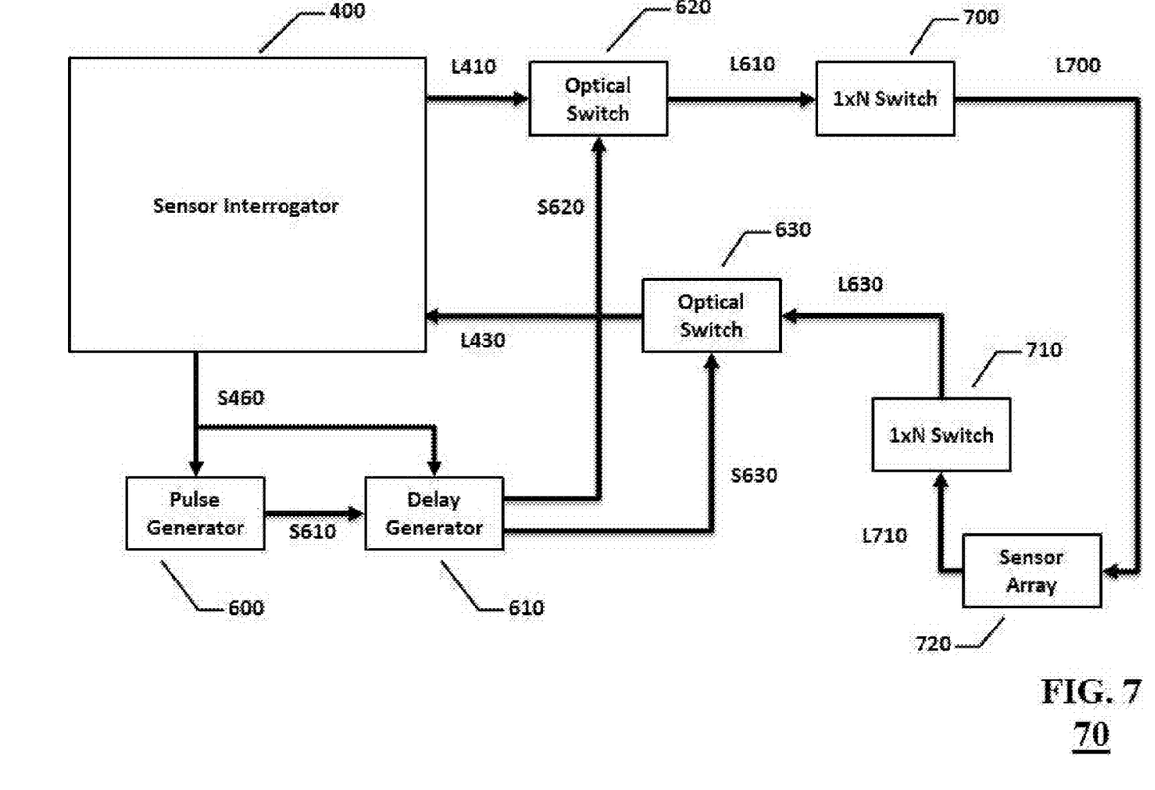
FIG. 7 is a diagram of an alternative modification of sensor system according to another embodiment of the invention.

FIG. 7 shows a TDM sensor system 70 according to one embodiment. In contrast with TDM sensor system 60, the optical circulator 670 is absent and there are no bidirectional paths between the interrogator 400 and the sensor array 720. The output L610 of optical switch 620 connects to 1×N optical switch 700. The output L700 of 700 is a multi-fiber cable leading to sensor array 720. Each fiber in sensor array 720 can include multiple sensors physically separated by longitudinal fiber distance. The output of fiber array L710 interfaces with 1×N switch 710 with an output L630.

Symbols M and N as used above represent one or more inputs and/or outputs. When more than one M×N component is used in a single implementation, some embodiments use identical or different values of M or N from component to component.

Reference Laser

In some embodiments, one laser is locked to an atomic or molecular reference. The choice of reference depends on the desired wavelength range, the specifications for stability and required laser power, convenience in packaging the reference, and other technical considerations. For example, potassium or rubidium references have well-characterized spectral features in the range from 750 nm to 800 nm, allowing indirect stabilization of C-band lasers with the use of optical frequency doubling.

However, the embodiments use different laser wavelength stabilized to any well-characterized atomic or molecular spectral lines. Some embodiments also use other absolute wavelength references, such as reference cavities, or lasers with good enough stability, e.g., a mode-locked laser.

Figure 8A:
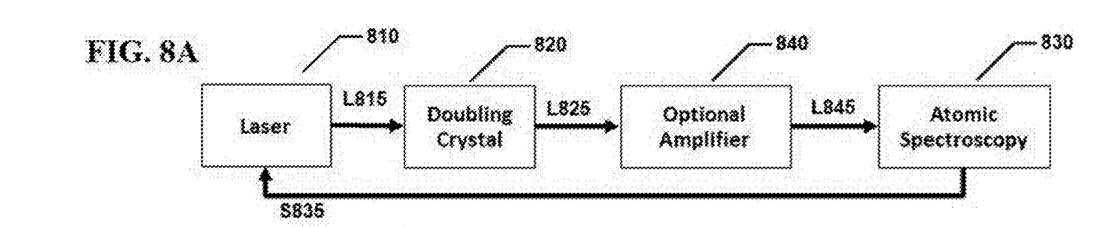
FIGS. 8A, 8B and 8C are diagrams of frequency doubling methods according to various embodiments of the invention.
Figure 8B:
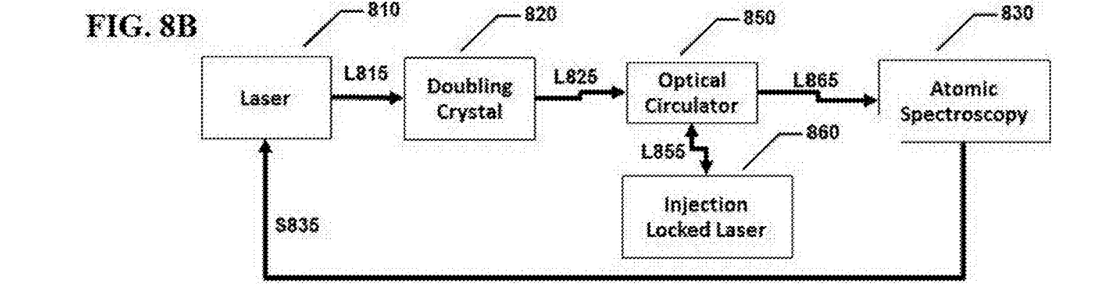

FIGS. 8A-B show diagrams of methods for use in frequency doubling to lock a reference laser (which could be used as the Optical Frequency Reference Source 500) at one wavelength (such as a C-band telecom laser) to an atomic or molecular reference (such as an Rb or K atomic cell) at a wavelength approximately double the frequency of the laser. As used herein, terms "atomic reference" or "atomic" refer to references derived from atoms or from molecules.

Figure 8C:
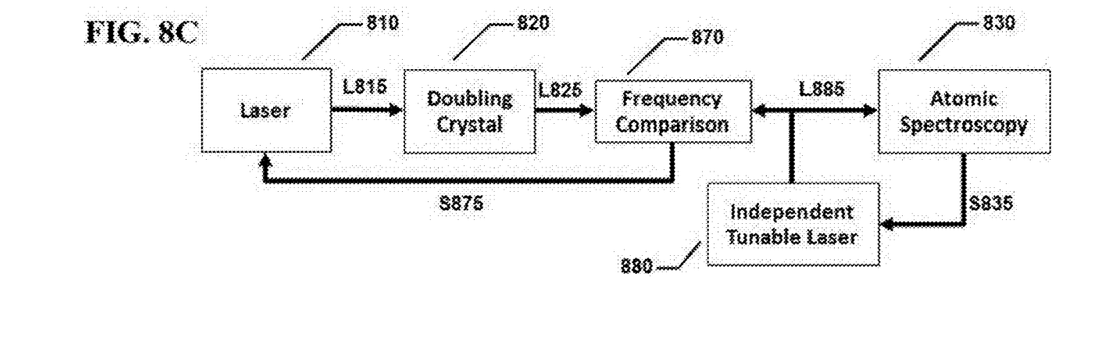

In FIGS. 8A, 8B, and 8C, light L815 from a tunable laser 810 is sent to a doubling crystal 820. The doubled light L825 is then directed through other components, depending on the implementation. Atomic Spectroscopy 830 is performed to provide an electrical control signal S835 indicating how to adjust an optical frequency to match the atomic spectrum or to have a specific difference in frequency from a feature of the atomic spectrum.

In FIG. 8A, the doubled light L825 is optionally sent through an amplifier 840. The light L845 (which may be identical to L825 if no amplifier is used) is then used to perform atomic spectroscopy 830. The control signal S835 is sent back to laser 810, whose output L815 is adjusted in frequency to lock light L845 to an atomic transition.

In FIG. 8B, the doubled light L825 passes through an optical circulator 850. The circulator directs light L825 to a laser 860, which can be injection locked by light L825. The output light L865 from the laser 860 passes back through the circulator 850 and is used to perform atomic spectroscopy 830. Again, the control signal S835 is sent back to laser 810, whose output L815 is adjusted in frequency to lock light L845 to an atomic transition.

In FIG. 8C, an independent tunable laser 880, which in one embodiment operates at approximately twice the frequency of laser 810, produces light L885, which undergoes a frequency comparison 870 with the double light L825. The Frequency Comparison 870 can, for example, involve beating light L885 and L825 together on a photodiode and counting the frequency, possibly while using dithering or other methods. The frequency comparison 870 provides a control signal S875 which indicates how laser 810 should be adjusted so that light samples L825 and L885 are at the same frequency or have a specific desired frequency difference. A portion of light L885 is used to perform atomic spectroscopy 830. Here, the control signal S835 is used to adjust the frequency of laser 880 to lock light L885 to an atomic transition. Thus, the laser 810 is indirectly locked to the atomic spectroscopy 830.

By having one laser locked to an atomic reference and one laser similar in frequency but tunable, some embodiments measure distance with high absolute accuracy and resolve the ambiguity due to fringe uncertainty. In one embodiment, the tunable laser needs a narrow line width and the ability to tune the frequency, but the presence of the atomic stabilized laser and traceable microwave electronics allows the tunable laser to maintain absolute wavelength accuracy over a wide enough range of frequencies to directly measure the free spectral range of the measured optical system.

As the tunable laser's frequency is adjusted, two or more spectral features of the optical signal (minima, maxima, or quadrature points in transmission or reflection), can be identified, at which point the tunable laser is beat against the stabilized laser, and the resulting beat note identifies the exact optical frequencies of the spectral features. By locating two or more features, the FSR can be calculated to the accuracy of the microwave electronics, allowing the integer number of wavelengths N in the length $\Delta L$ can be unambiguously determined. Thus ΔL can be measured to the fractional accuracy of the stabilized laser frequency.

Sub-Doppler Absorption Spectroscopy

In order to use atomic or molecular references as accurate wavelength references, the Doppler broadening of the absorption spectrum is overcome by some embodiments. Because such references are used at room-temperature if not significantly hotter, their natural spectral features are broadened to a minimum of several GHz. Doppler-free spectroscopy techniques are used to accomplish this. For the remainder of this disclosure, the term "atom" refers to atoms or molecules used as frequency references.

In Doppler-free absorption spectroscopy, at least two lasers are used: a probe which is passed through a gas of atoms and then measured, and a pump which is intense enough to drive a substantial fraction of resonant atoms into an excited state. The pump and probe can be directed into the cell from different directions (often anti-parallel to each other), and their frequencies are generally different from each other. Although the absorption of either beam on its own is Doppler broadened, the action of the pumping beam only effects the probe beam measurements when the frequencies of both beams are tuned such that they resonantly interact with the atoms travelling at the same velocity. This produces a narrow spectral feature, unaffected by Doppler broadening, which the laser can be locked to.

There are several possible methods to achieve Doppler-free spectroscopy of atomic vapor, but they generally involve taking a sample of the laser to be stabilized, sending it through one or more optical modulators, splitting it into one or more beams, and measuring at least one of the beams on a photodiode or other intensity measuring device. Embodiments of the invention can use any type of Doppler-free spectroscopy for locking the reference laser as a single functional element in the diagrams, which is to be understood to include a vapor cell and those optical and electronic components needed to implement the measurement and provide an appropriate error signal for stabilizing the laser.

Frequency Doubling

Many atomic spectroscopic lines used for reference are in the visible spectrum (between 500 and 800 nm), but cheap, well-characterized optical devices are more common in specific bands in the Near-infrared (NIR), such as 1064 nm, 1310 nm, or from 1540 to 1600 nm. Thus, some embodiments effectively use a non-linear optical element to frequency double a NIR laser into the visible range near a selected atomic reference, particularly rubidium (at 780 nm) or potassium (at 770 nm). Such embodiments allow frequency stability while taking advantage of the mature technology used in the optical telecommunications industry.

One embodiment directly use the frequency doubled output from a non-linear optical element for the atomic spectroscopy. However, elements used to frequency double lasers, depending on the initial power and wavelengths involved, can be inefficient in terms of the ratio of initial power in to frequency doubled power out. Because any implementation of Doppler-free atomic spectroscopy requires a minimum amount of laser power, one embodiment uses a dedicated visible laser locked to the atomic reference. A portion of a NIR laser can then be frequency doubled, and the resulting (potentially weak) visible light can be beat with a sample of the locked visible laser, with the NIR laser frequency adjusted to maintain the exact frequency relationship desired.

Further options could be used that do not include a dedicated frequency doubler. Small nonlinear terms present in any optical device (including amplifiers and photodiodes) mean that a NIR beam can be directly overlapped with a visible laser, and specific spectroscopic features related to non-linear effects could be isolated and measured to give an error signal representing the frequency relationship between the widely separated wavelengths. Furthermore, with two-photon or multi-photon interactions in atomic vapors, it could be possible to perform spectroscopy on an atomic feature directly with a NIR laser, even if the atomic feature is nominally at a visible wavelength.

Adding Sidebands to Reference Laser to Extend the Tuning Range

In some embodiments, the tunable laser is beat directly with the reference laser and measured with microwave electronics. However, the direct beating can limit the maximum frequency difference between the tunable laser and the fixed reference to be no larger than the electronics bandwidth. By using optical modulators to add sidebands to either the reference laser or to the tunable laser, the tuning range can be extended. In one embodiment, the tuning range is extended by the modulation frequency, in effect beating the sidebands of one laser with the fundamental frequency of the other. The embodiment can involve multiple modulators, such as adding sidebands to both lasers and beating sidebands together, or using multiple modulators on one laser to efficiently produce higher-order sidebands.

However, adding sidebands can have less than unity efficiency, and modulators have inherent losses, so the tuning range is improved by sacrificing power and reducing the signal to noise ratio of measurements. Thus the benefits of a tuning range wider than the electronics bandwidth are weighed in specific applications against the impact on accuracy, resolution, or integration time. However, because optical modulators can be turned off to leave the power in the fundamental laser modes, or a switching network can optionally bypass the modulator network entirely, a system according to one embodiment is constructed such that the system can switch between a high-resolution mode (with no sidebands and optimized SNR), and a wide-tuning range mode (with sidebands added at the expense of SNR).

Interferometric Sensing

Various embodiments of the invention determine the distances as part of the interferometric sensing in circumstances where the usage of electronic devices is problematic. In some embodiments, see, e.g., an embodiment of FIG. 3A, interferometric sensors are detached from the interrogating systems. Such arrangement allows to place interferometric sensors in the harsh environments, e.g., underground where the usage of electronic devices is problematic, and to conduct all measurements in the aboveground interrogator system.

Exemplar applications for such interferometric sensing include a tilt meter based on optical reflectors that move depending on the direction of gravity, and various pressure, temperature, and strain sensing. The principles employed by various embodiments are suited for measurements taken with extremely high accuracy over long periods of time, such as measuring tectonic drift or volcanic activity with laser rangefinders, monitoring tiltmeters to observe the effects of prolonged underground activity, e.g., from construction projects, oil and gas production, or ground-water usage, or long-term data collection from any sensors which can be interrogated by measuring distances optically.

FIG. 9 shows a schematic of a sensor employed by some embodiment of the invention. The sensor includes an unbalanced optical interferometer that delays a copy of the test signal emitter by the interrogator system over the distance to be measured.

An unbalanced optical interferometer can generally be described as a system which splits an optical light source into two (or more) paths of unequal optical length and coherently recombines them to produce an interferogram. The output intensity Iout from an unbalanced interferometer is $$I_{out} = 2I_{in}\left[1 + \cos\left(\frac{2\pi n v_o}{c}\Delta L\right)\right],$$

where Iin is the input optical intensity, ΔL is the unbalanced path length, n is the index of refraction of the unbalanced path, $v_o$ is the optical frequency, and c is the speed of light in vacuum (approximately 3e8 m/s). Measurements of Iout for a given Iin can be used to determine an unknown $v_o$, ΔL, or n when the other two parameters are known. In the case of an absolute displacement sensor, ΔL is the parameter of interest and $v_o$ must be well known.

The above transfer function applies to a Michelson interferometer, but many other configurations of interferometers could be used, including (but not limited to) Mirau, Fizeau, or Mach Zender. Also, optical cavities (including Fabry Perot cavities, etalons, ring cavities, folded cavities or others) similarly give a periodic response as frequency is varied, with a Free Spectral Range determined by the cavity spacing, which can be interpreted in the same way as the path mismatch ΔL in an interferometer. We do not present detailed functions for these various interferometers, but adapting our invention to analyze them would be straightforward and trivial.

Accordingly, some embodiments of the invention combine an absolute wavelength reference with traceable microwave measurements to enable optical interferometry with high precision and accuracy. The system according to some embodiments provides absolute distance measurements with accuracy greater than 1 ppb. The system avoids any fundamental source of long-term drift. The system need not run continuously, as there are no temperature sensitive elements or requirements for tracking changes over time. The system can be powered down for weeks or months and then powered up without loss of accuracy or precision. The system can use standard telecom wavelengths if the appropriate atomic references are used. For that matter, the system can use any wavelength where atomic or molecular references are available.

One embodiment also includes optional features described above in more details. For example, one embodiment locks a laser (for example, C-band, L-band, 1310 nm or 1064 nm) by using a frequency doubled sample to perform spectroscopy on atoms or molecules (Rb, K, I2). This embodiment can be advantageous because such lasers are cheap and reliable and the reference cells are well-known and commercially available.

One embodiment uses a stabilized frequency comb system to provide the absolute wavelength reference. A system of this embodiment is stabilized with only microwave frequency references instead of atomic or molecular cells According to another embodiment, a tunable laser is first stabilized to match a characteristic frequency of an external cavity, which can then be locked to an atomic reference or dithered in length to perform the harmonic analysis. The advantage of this approach is that the cavity and the laser can be independently selected to achieve the desired specs and tunability. The laser can be selected for low cost, power, wavelength, or other considerations, while the cavity can be selected to determine stability, line width, or mode structure.

The method for tuning the laser across the interferometer transfer function to analyze for Free Spectral Range according to one embodiment can resolves fringe ambiguity. Such analysis has the advantage of resolving the fringe ambiguity without requiring multiple tunable lasers or continuous measurements to track fringes.

The method of measuring a finite number of specific features (at least two) on the interferometer transfer function with harmonic analysis allows one embodiment to quickly and accurately determine the Free Spectral Range. Advantageously, the electronics and data processing of this embodiment are simple to implement and can be done more quickly than collecting and analyzing an arbitrary sampling of the transfer function.

One embodiment advantageously uses multiplexing to interrogate multiple interferometers or cavities along multiple transmission lines. This embodiment requires only one set of lasers for many distinct interferometers.

According to another embodiment, after the reference laser is known to be stable, only RF and microwave measurements are performed for frequency analysis, which reduce the cost of measurement.

The above-described embodiments of the present invention can be implemented in any of numerous ways. When implemented using software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

We claim:
1. A method for determining a distance, comprising:
transmitting to an interferometer a test signal oscillating with a test frequency, wherein the test frequency is varying such that the test signal oscillates with different values of the test frequency;

receiving, in response to the transmitting, an interferometric signal formed by interfering the test signal with a delayed signal produced by delaying a copy of the test signal over the distance equal to a path length difference in the interferometer, such that the values of the interferometric signal are indicative of the distance and based at least in part on the values of the test frequency;

selecting two values of the test frequency and measuring the corresponding intensity or phase of the interferometric signal at each selected test frequency, the test frequency formed by beating the test signal with a reference signal having a reference frequency, measuring a first beat frequency for the first value of the test frequency, measuring a second beat frequency for the second value of the test frequency, computing the two values of the test frequency from the difference between the reference frequency and each of the first and second beat frequencies;

modulating the test signal or the reference signal such that the test signal or the reference signal acquires additional frequency components ensuring that the beat frequency is within the microwave or the radio frequency domains; and determining the distance using the two values of the test frequency and the measured intensity or phase of the interferometric signal to solve for the distance based on the known interferometer transfer function.

2. The method of claim 1, wherein the values of the test frequency are in an optical domain, and wherein a difference between a value of test frequency and the value of the reference frequency is in a microwave domain or a radio frequency domain, further comprising:

interfering the test signal with the reference signal to produce a modulated signal having a high frequency component oscillating with a carrier frequency and a low frequency component oscillating with a beat frequency;

measuring a value of the beat frequency; and determining the test frequency with the specified accuracy based on the value of the beat frequency and the value of the reference frequency.

3. The method of claim 1, wherein the two values of the test frequency include a first value and a second value, further comprising interfering the reference signal and the test signal with the test frequency having the first and the second values to produce a first modulated signal and a second modulated signal and measuring a first beat frequency of the first modulated signal and a second beat frequency of the second modulated signal;

determining the first value of the test frequency based on the first beat frequency and the reference frequency; and determining the second value of the test frequency based on the second beat frequency and the reference frequency.

4. The method of claim 1, wherein the reference signal is locked on an atomic reference or a molecular reference.

5. The method of claim 1, wherein the values of the interferometric signal include one or combination of amplitudes of an intensity of the interferometric signal, and phases of the interferometric signal.

6. The method of claim 1, further comprising:

interfering, concurrently with the transmitting, the test signal with the reference signal to produce a modulated signal for each value of the test frequency;

measuring a beat frequency of the modulated signal and the value of the interferometric signal for each value of the test frequency;

determining a map of corresponding values of the beat frequencies and/or the test frequencies, and values of the interferometric signal; and determining the two values of the test frequencies using the map.

7. A system for measuring a distance, comprising:

a tunable laser module with a stabilized reference frequency, for emitting a test signal oscillating with a tunable test frequency and for determining values of the tunable test frequency relative to the stabilized reference frequency;

the tunable laser module further comprising a modulator modulating the test signal or the reference signal such that the test signal or reference signal acquires additional frequency components ensuring that the beat frequency is within the microwave or the radio frequency domains;

an optical detector for determining values of an interferometric signal corresponding to the values of the test frequency, wherein the interferometric signal is produced in response to emitting the test signal, such that the values of the interferometric signal are indicative of the distance; and a processor for:

selecting two values of the test frequency and measuring the corresponding intensity or phase of the interferometric signal at each selected test frequency, the test frequency formed by beating the test signal with a reference signal having a reference frequency;

measuring a first beat frequency for the first value of the test frequency, measuring a second beat frequency for the second value of the test frequency, computing the two values of the test frequency from the difference between the reference frequency and each of the first and second beat frequencies;

modulating the test signal or the reference signal such that the test signal or the reference signal acquires additional frequency components ensuring that the beat frequency is within the microwave or the radio frequency domains; and determining the distance using the two values of the test frequency and the measured intensity or phase of the interferometric signal to solve for the distance based on the known interferometer transfer function.

8. The system of claim 7, wherein the tunable laser module comprises:

a tunable laser for emitting the test signal;

a reference laser for emitting a reference signal oscillating with the reference frequency;

an optical splitter for splitting the test signal into a sampled path and an output path;

an optical combiner for combining the test signal received from the sampled path with the reference signal to produce a modulated signal having a high frequency component oscillating with a carrier frequency and a low frequency component oscillating with a beat frequency, wherein the beat frequency is within a microwave domain or a radio frequency domain; and a measurement module for determining the beat frequency and for determining the test frequency with the specified accuracy based on the beat frequency and the reference frequency.

9. The system of claim 7, wherein the controller determines a map of corresponding values of the test frequencies and the values of the interferometric signal, selects from the map at least two values of the test frequency corresponding to particular values of the interferometric signal, and determines the distance using the two values of the test frequency.

10. The system of claim 7, further comprising a dither signal generator for generating a dither signal modulating the test signal and a harmonic analysis system for determining values of the interferometric signal based on a copy of the dither signal.

11. The system of claim 8, further comprising a sensor including an unbalanced interferometer for receiving the test signal from the output path and for producing the interferometric signal by delaying a copy of the test signal over the distance equal to a path length difference in the interferometer.

12. The system of claim 11, wherein the sensor is arranged underground, wherein the output path is formed at least in part by a fiber connecting the sensor with the tunable laser module, and wherein the sensor includes a tilt meter, such that the distance is changing based on a direction of gravity.

13. The system of claim 11, further comprising a processor for determining based on the distance one or combination of a temperature, a pressure, and strain in an environment of the sensor.

14. The system of claim 11, further comprising a plurality of sensors for producing a plurality of interferometric signals.

15. The system of claim 8, wherein the reference signal is derived from an atomic reference or a molecular reference.

16. The system of claim 8, wherein the reference signal is derived from an optical frequency comb.

* * * * *